US011936154B2

(12) United States Patent
Conte et al.

(10) Patent No.: US 11,936,154 B2
(45) Date of Patent: Mar. 19, 2024

(54) CABLE PROCESSING MACHINE SYSTEM AND METHOD FOR REMOVING ONE OR MORE CABLES FROM A REMOVAL TROUGH OF A CABLE PROCESSING MACHINE SYSTEM

(71) Applicant: Komax Holding AG, Dierikon (CH)

(72) Inventors: Alois Conte, Ebikon (CH); Nils Furrer, Thalwil (CH); Dominik Feubli, Kriens (CH)

(73) Assignee: KOMAX HOLDING AG, Dierikon (CH)

( * ) Notice: Subject to any disclaimer, the term of this patent is extended or adjusted under 35 U.S.C. 154(b) by 554 days.

(21) Appl. No.: 17/250,346

(22) PCT Filed: Jul. 17, 2019

(86) PCT No.: PCT/EP2019/069271
§ 371 (c)(1),
(2) Date: Jan. 8, 2021

(87) PCT Pub. No.: WO2020/020727
PCT Pub. Date: Jan. 30, 2020

(65) Prior Publication Data
US 2021/0135419 A1  May 6, 2021

(30) Foreign Application Priority Data
Jul. 24, 2018  (EP) ..................... 18185288

(51) Int. Cl.
*B65G 47/78* (2006.01)
*B65G 47/14* (2006.01)
(Continued)

(52) U.S. Cl.
CPC ......... *H01R 43/28* (2013.01); *B65G 47/1407* (2013.01); *B65G 47/78* (2013.01); *B65G 65/23* (2013.01); *H02G 1/1248* (2013.01)

(58) Field of Classification Search
USPC .......................................... 414/746.2, 746.7
See application file for complete search history.

(56) References Cited

U.S. PATENT DOCUMENTS 2,804,737 A * 9/1957 Rogier ................... G07D 9/065
453/31
2,998,633 A * 9/1961 Andren ................ H02G 1/1248
29/33 M
(Continued)

FOREIGN PATENT DOCUMENTS

CN         102447210 A      5/2012
CN         108354192 A  *  8/2018  ............... A23N 7/00
(Continued)

OTHER PUBLICATIONS

US 7,125,867, 5/2007, Noseda et al. (withdrawn)

*Primary Examiner* — Joseph A Dillon, Jr.
(74) *Attorney, Agent, or Firm* — William J. Clemens; Shumaker, Loop & Kendrick, LLP

(57) ABSTRACT

A cable processing machine system includes a cable processing machine for processing a cable, a cable tray for receiving cables processed by the cable processing machine, and a removal trough, the cable tray being pivotable to transfer cables from the cable tray into the removal trough when the cable tray pivots. The removal trough includes an exit conveyor belt for conveying the cables along a transport direction away from the cable processing machine to an end of the removal trough.

20 Claims, 5 Drawing Sheets

(51) Int. Cl.
  *B65G 65/23* (2006.01)
  *H01R 43/28* (2006.01)
  *H02G 1/12* (2006.01)

(56) References Cited

U.S. PATENT DOCUMENTS

| | | | | |
|---|---|---|---|---|
| 3,217,461 | A * | 11/1965 | Wheelock | B65B 13/022 |
| | | | | 100/9 |
| 3,245,135 | A * | 4/1966 | Netta | B65G 47/1471 |
| | | | | 29/748 |
| 3,298,217 | A * | 1/1967 | Netta | H01R 43/052 |
| | | | | 72/434 |
| 3,870,774 | A * | 3/1975 | Maroschak | B65G 47/82 |
| | | | | 425/DIG. 231 |
| 3,941,639 | A * | 3/1976 | Maroschak | B65G 57/186 |
| | | | | 156/244.14 |
| 5,017,074 | A * | 5/1991 | Fabbri | B23B 13/08 |
| | | | | 198/453 |
| 5,429,161 | A * | 7/1995 | Allard | G01B 11/00 |
| | | | | 702/170 |
| 5,960,622 | A | 10/1999 | Koch et al. | |
| 6,463,849 | B2 * | 10/2002 | Mizutani | H01R 43/28 |
| | | | | 29/33 M |
| 6,658,726 | B1 | 12/2003 | Conte | |
| 6,896,019 | B2 * | 5/2005 | Achard | B23Q 1/621 |
| | | | | 144/248.6 |
| 9,373,924 | B2 * | 6/2016 | Fischer | H01R 43/048 |
| 9,640,954 | B2 | 5/2017 | Fischer | |
| 10,666,028 | B2 * | 5/2020 | Viviroli | H02G 1/1253 |
| 10,727,638 | B2 * | 7/2020 | Fuchs | H01R 43/052 |
| 11,451,000 | B2 * | 9/2022 | Weber | H01R 43/055 |
| 2001/0032680 | A1 | 10/2001 | Mizutani | |
| 2002/0098073 | A1 * | 7/2002 | Drei | B23B 13/126 |
| | | | | 414/746.4 |
| 2012/0263344 | A1 * | 10/2012 | Viviroli | G01B 11/2433 |
| | | | | 382/100 |
| 2021/0134489 | A1 * | 5/2021 | Conte | H01R 43/048 |
| 2021/0320469 | A1 * | 10/2021 | Conte | H01R 43/28 |

FOREIGN PATENT DOCUMENTS

| | | |
|---|---|---|
| DE | 102007040035 A1 | 3/2009 |
| EP | 0788200 A2 | 8/1997 |
| EP | 1079479 A1 | 2/2001 |
| EP | 1653576 A1 | 5/2006 |
| EP | 2442413 B1 | 8/2017 |
| JP | 52037376 A * | 9/1978 |

* cited by examiner

PRIOR ART

CABLE PROCESSING MACHINE SYSTEM AND METHOD FOR REMOVING ONE OR MORE CABLES FROM A REMOVAL TROUGH OF A CABLE PROCESSING MACHINE SYSTEM

FIELD

The present invention relates to a cable processing machine system and a method for removing one or more cables from a removal trough of a cable processing machine system.

BACKGROUND

Common cable processing machines or cable processing machine systems can produce batches of cables or production batches, i.e. a plurality of pieces of an identically assembled cable, fully automatically. However, the production batches are usually removed by hand by the machine operator.

FIG. 6 shows a typical pivot-machine-type cable processing machine of a cable processing machine system according to the prior art. The mode of operation and the structure are shown, for example, in patent specification EP 2 442 413 B1.

The cable processing machine or the cable processing machine system 1 comprises a straightening unit 2' for aligning the cable, a cable conveyor 3' for conveying or transporting the cable, two crimping presses 7', 8' for connecting a crimp contact from a contact roller 10' to the cable. In addition, the cable processing machine or the cable processing machine system comprises a conveyor belt 25', which moves the cable along the cable processing axis 15'.

The number of the same cables to be produced is usually divided into smaller production batches which are taken individually from the cable processing machine. Conventional cable processing machines have a cable tray, in which the finished or processed cables are stored until the number of a production batch is reached, and a removal trough 28', from which the batch can be removed by hand.

Above the cable tray, there is a conveyor belt 25' which keeps the cable to be processed stretched during the transport process. When processing is complete, the cable falls from the conveyor belt into the cable tray. The cable tray can be pivoted, as a result of which the cables of a production batch fall into the removal trough 28'. The cables must be manually removed from the removal trough 28', and the removal of the batches from the removal trough 28' must be confirmed by the operator, which means that the cable processing machine stops after each manufactured batch until the operator removes the batch from the removal trough 28' and this has been acknowledged. Often one operator looks after a plurality of cable processing machines. As a result, the cable processing machine is at a standstill much longer than the actual removal process takes.

In order for short cables to be removed more easily, there are removal troughs which can be moved in the longitudinal direction parallel to the cable processing axis 15' before removal. Patent EP 2 442 413 B1 describes a cable tray in detail.

Among other things, there may be a need for a cable processing machine system or a method in which or by means of which cables can be removed from the removal trough 28' in a technically simple manner.

SUMMARY

According to one aspect of the invention, a cable processing machine system is proposed comprising a cable processing machine for processing a cable, a cable tray for receiving cables processed by the cable processing machine, and a removal trough, the cable tray being pivotable in such a way that cables are transferred from the cable tray into the removal trough when the cable tray pivots, characterized in that the removal trough includes a movable exit conveyor belt for conveying the cables along a transport direction away from the cable processing machine to an end of the removal trough.

One advantage of this is that the cable or cables or the production batch of cables can usually be transported in a technically simple manner to a position at which the cable or cables can be removed from the removal trough in a technically simple and fast manner, for example by means of a gripper arm. In particular, the cable or cables can usually be moved so far by means of the exit conveyor belt that they partially protrude beyond the removal trough. As a result, the cables can typically be removed automatically from the removal trough even more easily. As a rule, the operation of the cable processing machine therefore does not have to be interrupted.

According to a second aspect of the invention, a method for removing one or more cables from a removal trough of a cable processing machine system, in particular from a removal trough of a cable processing machine system as described above, is proposed, the method comprising the following steps: moving one or more cables located in the removal trough away from a cable processing machine of the cable processing machine system to an end of the removal trough by means of an exit conveyor belt; and gripping and removing the cable or cables located at the end of the removal trough from the removal trough by means of a gripper arm.

The advantage of this method is that the cable or cables or the production batch of cables is typically transported in a technically simple manner to a position at which the cable or cables can be removed from the removal trough in a technically simple and fast automated manner. In particular, the cable or cables can usually be moved so far by means of the exit conveyor belt that they partially protrude beyond the removal trough. As a result, the cables can usually be removed automatically even more easily from the removal trough by means of the gripper arm. The operation of the cable processing machine therefore typically does not have to be interrupted.

Possible features and advantages of embodiments of the invention may be considered, inter alia and without limiting the invention, to be dependent upon the concepts and findings described below.

According to one embodiment of the cable processing machine system, the removal trough has sidewalls. As a result, the cable or cables is/are typically guided particularly safely in the removal trough, while the cable or cables is/are transported to an end of the removal trough by means of the exit conveyor belt.

According to one embodiment of the cable processing machine system, the sidewalls are firmly connected to the exit conveyor belt in such a way that the sidewalls are moved together with the exit conveyor belt. As a result, the sidewalls can be moved in a technically simple manner at the same speed as the exit conveyor belt. In addition, a jamming or pinching of a cable between one of the sidewalls and the exit conveyor belt is essentially excluded.

According to one embodiment of the cable processing machine system, the sidewalls each have an accordion-like shape in a cross section parallel to the surface of the exit conveyor belt, so that the sidewalls can be at least partially extended and compressed along a direction that runs parallel to the transport direction, and the removal trough faces a deflection roller for deflecting the exit conveyor belt and the sidewalls. As a result, the exit conveyor belt and the sidewalls can typically be turned or deflected in a technically simple manner without the occurrence of major mechanical stresses in the sidewalls, so that the exit conveyor belt and the sidewalls, for example on an underside of the removal trough, can be moved in a direction that is antiparallel to the transport direction or the direction of movement of the cables on the exit conveyor belt.

According to one embodiment of the cable processing machine system, the removal trough has at least one bundle gripper, in particular two bundle grippers, for gripping and holding one or more cables at one end of the removal trough. As a result, the cable or cables can usually be held in a technically simple manner at the end of the removal trough or at the end of the exit conveyor belt. This prevents the cables from falling out of the removal trough in a technically simple manner.

According to one embodiment of the cable processing machine system, the bundle gripper is designed or the bundle grippers are designed such that the gripping force with which the respective bundle gripper grips the one or more cables is adjustable. One advantage of this is that the cable can usually slide through the respective closed bundle gripper. This means that cables can typically be routed in a technically simple manner.

According to one embodiment of the cable processing machine system, a distance between the bundle grippers in the transport direction for tensioning a part of the cable or cables between the bundle grippers can be increased and decreased. The advantage of this is that a part of the cable or cables can usually be clamped between the bundle grippers in a technically simple manner. As a result, the gripping of the cables by a gripper arm or the like, which grips the tensioned part of the cable or cables between bundle grippers, is generally technically simplified.

According to one embodiment of the cable processing machine system, the removal trough at the end of the exit conveyor belt at which the cables can be conveyed by means of the exit conveyor belt has a support surface that is immovable relative to the cable tray for supporting part of the cable or cables. The advantage of this is that the cables can be moved beyond the end of the exit conveyor belt, typically without contacts connected to the cable, for example crimp contacts, being able to get caught. In addition, the friction between the support surface and the cable or cables generally prevents them from falling out of the removal trough at the end of the removal trough. Due to the support surface, they typically remain at the end of the removal trough, a part of the cable or cables resting or lying on the support surface.

According to one embodiment of the cable processing machine system, the removal trough has sidewalls that laterally delimit the support surface. The advantage here is that the cables are typically held particularly securely on the support surface and are particularly well protected against falling down to the side.

According to one embodiment of the cable processing machine system, the exit conveyor belt of the removal trough can be moved parallel to a direction that runs in a longitudinal direction of the cable tray, the cable tray having its greatest extent along the longitudinal direction. The advantage here is that the cable or cables can typically be moved away from the cable processing machine in a technically simple manner on the exit conveyor belt.

According to one embodiment of the cable processing machine system, the removal trough is arranged and designed in such a way that the removal trough extends further away from the cable processing machine than the cable tray. As the removal trough protrudes beyond the cable tray, the cables transported to the end facing away from the cable processing machine are typically in a position where they can be automatically gripped without the cable tray constituting an obstruction to the movement of the gripper arm. This means that the cables can generally be gripped more easily automatically at the end of the removal trough.

According to one embodiment of the cable processing machine system, the transport direction extends parallel to a cable processing axis along which the cables are moved while the cables are being processed by the cable processing machine. As a result, the cables usually reach the cable tray in a technically particularly simple manner in such a way that the cables can be transported or conveyed by means of the conveyor belt along their longitudinal direction (or along their greatest extent) without rotating the cables or the like.

According to one embodiment of the method, the cable or cables are held by a bundle gripper or two bundle grippers at one end of the removal trough while the gripper arm grips the cable or cables. The advantage of this method is that part of the cable or cables can usually be gripped in a technically particularly simple manner by a gripper arm or the like.

According to one embodiment of the method, the cable or cables is/are held under tension by two bundle grippers while the gripper arm grips the cable or cables. One advantage of this method is that the gripping of the cables by a gripper arm or the like, which grips the tensioned part of the cable or cables between bundle grippers, is generally technically simplified.

It should be noted that some of the possible features and advantages of the invention are described herein with reference to different embodiments of the cable processing system or the method for removing one or more cables from a removal trough of a cable processing machine. A person skilled in the art will recognize that the features can be suitably combined, adapted, or replaced in order to arrive at further embodiments of the invention.

Embodiments of the invention will be described in the following with reference to the accompanying drawings, although neither the drawings nor the description should be construed as limiting the invention.

The figures are merely schematic and are not true to scale. Like reference signs refer to like or equivalent features in the various figures.

DETAILED DESCRIPTION

Figure 1:
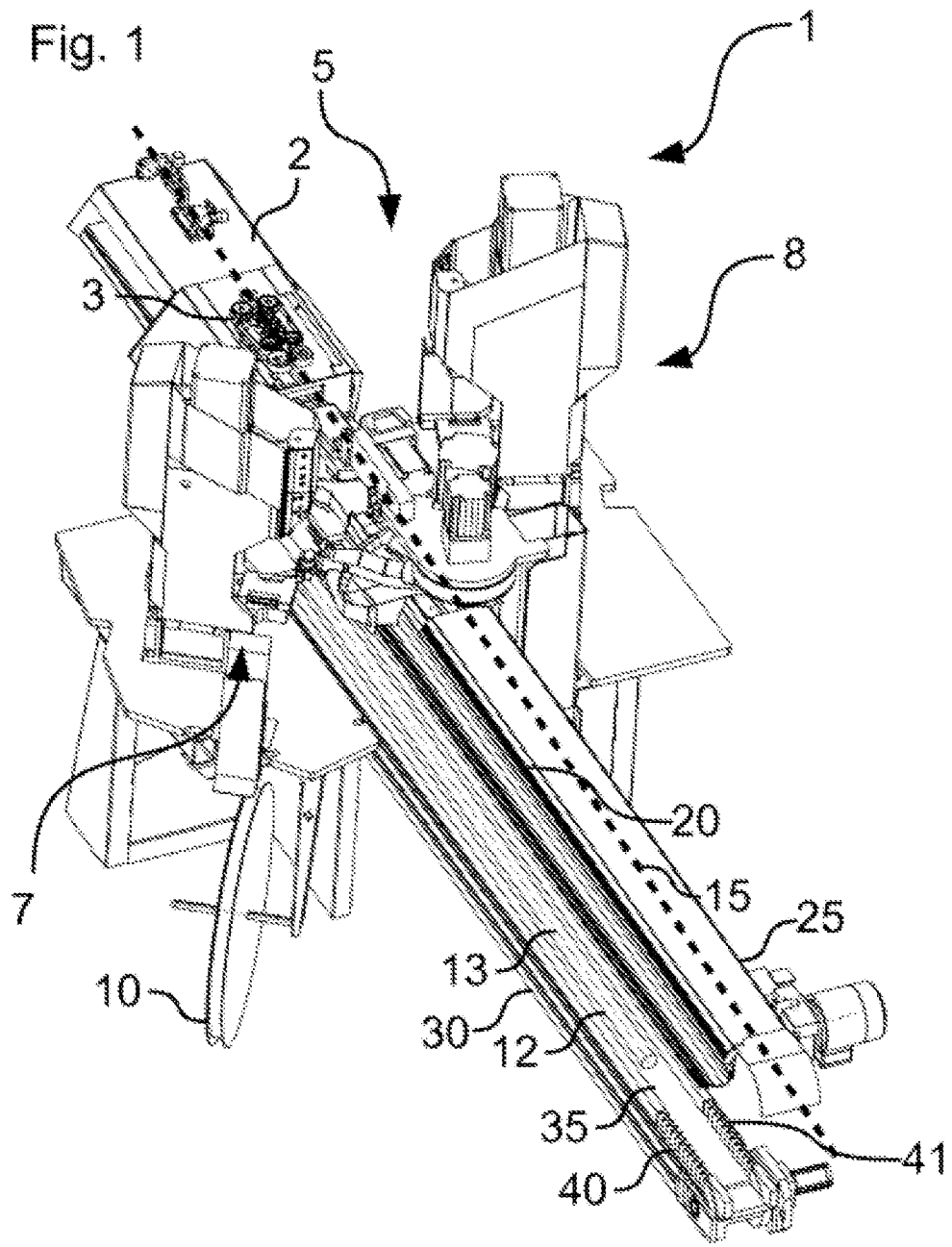
FIG. 1 is a perspective view of an embodiment of the cable processing system according to the invention with a removal trough.
Figure 2:
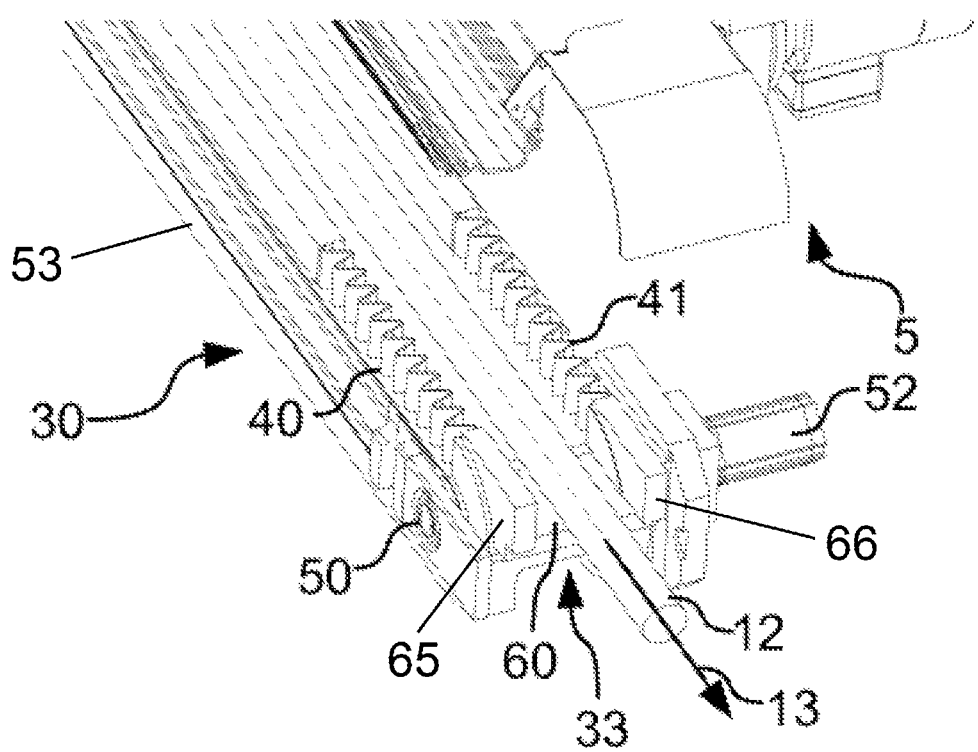
FIG. 2 is a detailed view of the removal trough from FIG. 1.

FIG. 1 shows a perspective view of an embodiment of the cable processing system according to the invention with a removal trough 30. FIG. 2 is a detailed view of the removal trough 30 from FIG. 1.

The cable processing machine system 1 comprises a straightening unit 2 for aligning the cable 12, a cable conveyor 3 for conveying or transporting the cable 12, two crimping presses 7, 8 for connecting a crimp contact from a contact roller 10 to the cable 12. In addition, the cable processing machine 5 or the cable processing machine system 1 comprises a conveyor belt 25 which moves the cable 12 along the cable processing axis 15. In addition, the cable processing machine system 1 comprises a removal trough 30.

Diagonally above the cable tray 20 is a conveyor belt 25, which keeps the cable 12 to be processed stretched during the transport process through the cable processing machine 5 or during processing of the cable 12 in the cable processing machine 5. During or after completion of the processing, the cable 12 falls from the conveyor belt 25 into the cable tray 20. The cable tray 20 can be pivoted or tilted, as a result of which the cables 12 of a production batch fall from the cable tray 20 into the removal trough 30.

The removal trough 30 comprises an exit conveyor belt 35. The exit conveyor belt 35 can be moved (on the top of the removal trough 30) in a transport direction 13 parallel to the cable processing axis 15 (=the axis along the longitudinal direction of the cables 12 during processing in the cable processing machine 5) or cable tray 20 away from the cable processing machine 5.

The exit conveyor belt 35 is an endless belt which is deflected around a deflection roller 50 at the front end 33 of the removal trough 30 and runs back on the underside of the removal trough 30. Sidewalls 40, 41, which laterally delimit the exit conveyor belt 35, are also deflected by means of the deflection roller 50 and run back on the underside of the removal trough 30.

The exit conveyor belt 35 is driven by means of a feed motor 52. The feed motor 52 drives the deflection roller 50.

At the opposite end of the exit conveyor belt 35, there is another deflection roller on which or by means of which the exit conveyor belt 35 and the sidewalls 40, 41 are deflected again and in this way come back to the top of the removal trough 30, where the exit conveyor belt 35 is again moved in transport direction 13.

One of the two deflection rollers 50 can be displaced linearly parallel to the transport direction 13 in order to tension the exit conveyor belt 35 and/or the sidewalls 40, 41.

The batch of cables 12 is shown in the drawings in a simplified manner by a cylindrical body. The batch of cables 12 can comprise, for example, 5-20, in particular cables 12 processed in the same way.

At one end of the exit conveyor belt 35, more precisely at the end of the exit conveyor belt 35 facing away from the cable processing machine 5, a support surface 60 is formed which also forms the end 33 of the removal trough 30. The support surface 60 is arranged rigidly relative to the cable processing machine 5, that is to say the exit conveyor belt 35 moves relative to the support surface 60. The support surface 60 also has sidewalls 65, 66 which are designed to be immovable relative to the support surface 60. The sidewalls 65, 66 of the support surface 60 can be part of the paneling 53, into which the sidewalls 40, 41 of the exit conveyor belt 35 are moved before they are deflected approx. 180° by means of the deflection roller 50.

Figure 3:
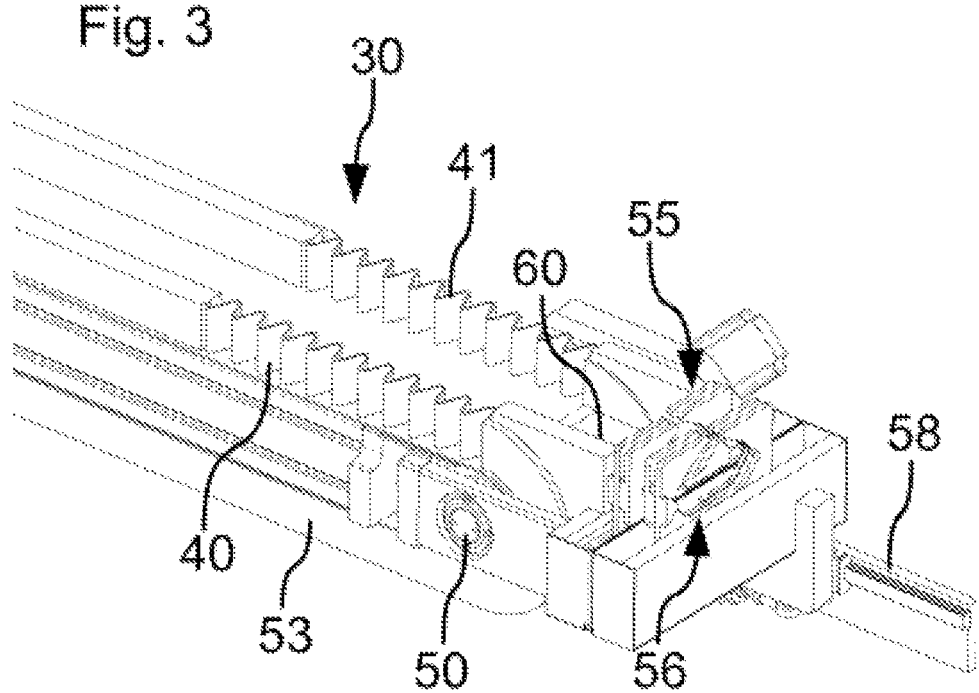
FIG. 3 is a detailed view of a removal trough of a second embodiment of the cable processing system according to the invention.

The exit conveyor belt 35 moves the cables 12 far enough that they are partially on the exit conveyor belt 35, partially on the support surface 60 and partially protrude beyond the removal trough 30, as shown in FIG. 3. Due to the friction between the cables 12 on the one hand and the support surface 60 on the other hand, the receiving trough ensures that the cables 12 are not transported further over the end 33 of the removal trough 30 and thus do not fall out of the removal trough 30 even if the exit conveyor belt 35 continues to move.

The exit conveyor belt 35 can be a flat belt.

The removal trough 30 has two sidewalls 40, 41 which delimit the interior of the removal trough 30 to the side. The sidewalls 40, 41 are firmly connected to the exit conveyor belt 35 in such a way that the sidewalls 40, 41 are moved along with the movement of the exit conveyor belt 35. By moving the exit conveyor belt 35, the sidewalls 40, 41 will thus also be moved.

The sidewalls 40, 41 each have a height such that they are higher than the height of the cable 12 or the batch of cables 12. In particular, the sidewalls 40, 41 can have a height which corresponds to at least half the width of the exit conveyor belt 35. The width of the exit conveyor belt 35 runs horizontally and perpendicular to the transport direction 13. As a result, production batches that each comprise a large quantity of items can be safely transported by means of the removal trough 30.

The sidewalls 40, 41 can be designed like bellows or as corrugated edges.

The sidewalls 40, 41 are each self-contained and are deflected by approx. 180° via the deflection roller 50 together with the exit conveyor belt 35 so that they run back together with the exit conveyor belt 35 on the underside of the removal trough 30, i.e. opposite to the transport direction 13. The deflection of the sidewalls 40, 41 and/or of the exit conveyor belt 35 and the return of the sidewalls 40, 41 and/or the exit conveyor belt 35 take place within a paneling 53, so that the sidewalls 40, 41 and/or the exit conveyor belt 35 essentially cannot be accidentally touched during the deflection or during the return in the direction of the cable processing machine 5.

The sidewalls 40, 41 are deflected together with the exit conveyor belt 35.

The sidewalls 40, 41 have the shape of a movable part of an accordion in a cross-section parallel to the surface of the exit conveyor belt 35. In the drawings, only part of the sidewall 40, 41 is shown as an accordion-like sidewall for presentation reasons. The sidewalls 40, 41, however, have such an accordion-like shape over their entire length. This means that the sidewalls 40, 41 have such an accordion-like shape over the entire length of the conveyor belt 35.

This shape allows the length of the respective sidewall 40, 41 on a side facing away from the exit conveyor belt 35 (so to speak, the upper part of the respective sidewall 40, 41) to be increased and decreased parallel to the transport direction 13. The part of the sidewalls 40, 41 closest to the exit conveyor belt 35 is fixedly or rigidly connected to the exit conveyor belt 35, so that this part essentially cannot change in the length parallel to the transport direction 13.

The exit conveyor belt 35 and the sidewalls 40, 41 can be formed as one piece. It is also conceivable that the sidewalls 40, 41 are welded to the exit conveyor belt 35. Other types of fixed connection between the exit conveyor belt 35 and the sidewalls 40, 41, such as gluing, riveting or the like, are also conceivable.

During the deflection around the deflection roller 50, the sidewalls 40, 41 or the part of the sidewalls 40, 41 that faces away from the exit conveyor belt 35 (the upper part of the respective sidewall 40, 41) must cover a longer distance than the exit conveyor belt 35, because the upper part of the respective sidewall 40, 41 is at a greater distance from the deflection roller 50 during the deflection than the exit conveyor belt 35. Due to the accordion-like shape of the sidewalls 40, 41, when the sidewalls 40, 41 are deflected together with the exit conveyor belt 35 around the deflection roller 50, no great mechanical stresses occur in the sidewalls 40, 41 since the length of the sidewalls 40, 41, or the part of the sidewalls 40, 41 which faces away from the exit conveyor belt 35, or the deflecting roller 50 is enlarged during deflection. After the deflection, the length is reduced back to the length before the deflection. Thus, breaking and/or tearing of the sidewalls 40, 41 during the deflection, as well as fatigue of the material of the sidewalls 40, 41 due to the deflection around the deflection roller 50, is reliably and technically easily prevented.

However, it is also conceivable that the sidewalls 40, 41 are stationary, that is to say are not moved. For example, the sidewalls 40, 41 can each have a fixed sheet metal panel or the like.

The exit conveyor belt 35 and/or the sidewalls 40, 41 can comprise or consist of a plastic (e.g. polyvinyl chloride (PVC) and/or polyurethane (PU)).

Figure 4:
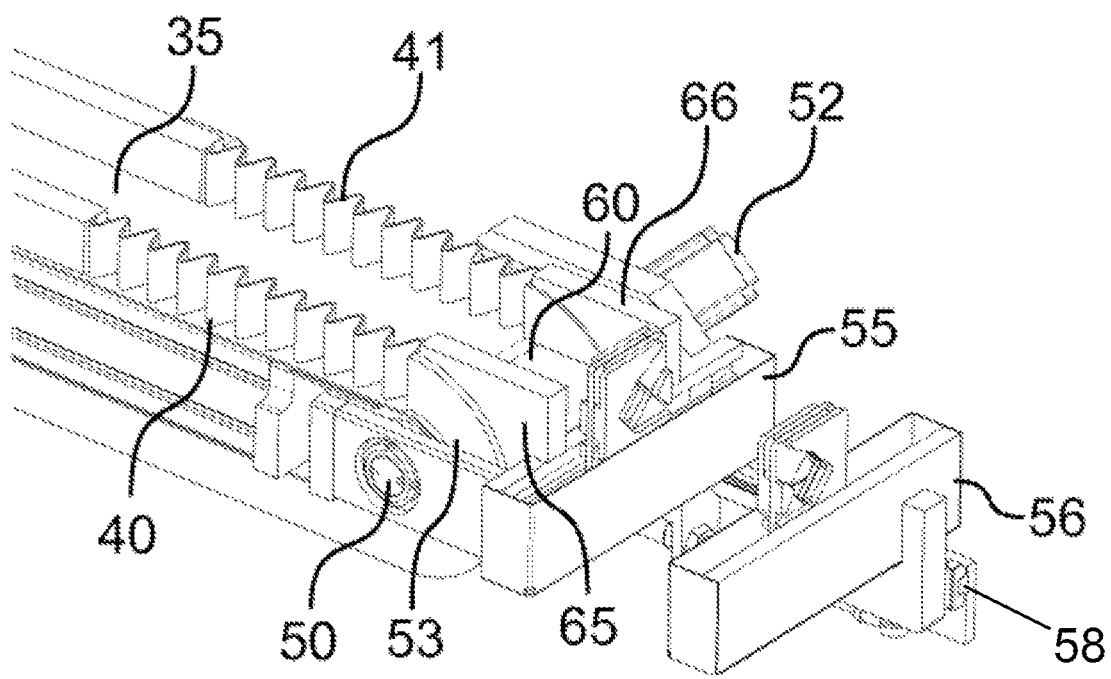
FIG. 4 is a further detailed view of the removal trough from FIG. 3.

FIG. 3 shows a detailed view of a removal trough 30 of a second embodiment of the cable processing system according to the invention. FIG. 4 shows a further detailed view of the removal trough 30 from FIG. 3.

The second embodiment differs from the first embodiment only in that the removal trough 30 additionally comprises two bundle grippers 55, 56 which are fastened to a rail 58. The bundle gripper 56 of the two bundle grippers 55, 56, which is further away from the exit conveyor belt 35, can be moved along the rail 58, so that the distance between the bundle gripper 55, which is closer to the exit conveyor belt 35, and the bundle gripper 56 further away from the exit conveyor belt 35 can be increased and can be reduced in size. The rail 58 runs parallel to the transport direction 13.

One of the two bundle grippers 55, 56 is located directly adjacent to the support surface 60.

In FIG. 3, the distance between the bundle grippers 55, 56 is as small as possible. In FIG. 4, the distance between the bundle grippers 55, 56 is as great as possible. The bundle gripper 56, which is further removed from the exit conveyor belt 35, is located at the outermost end of the rail 58.

The bundle grippers 55, 56 each comprise two jaws which can be in an open position (see FIG. 3) and which can be in a closed position (see FIG. 4). In the open position, the bundle gripper 55, 56 or the jaws of the bundle gripper 55, 56 have an opening at the top. In the closed position, both jaws of the bundle gripper 55, 56 surround the cables 12 held by the bundle gripper 55, 56.

The bundle grippers 55, 56 can be opened or closed pneumatically and/or with electric motors. In particular when the bundle grippers 55, 56 are driven by means of an electric motor, the jaws can be positioned in a number of intermediate positions between fully open and fully closed. The various intermediate positions can be programmed.

The force with which the bundle grippers 55, 56 grip the cables 12 can be adjusted so that the cables 12, while they are held by the bundle grippers 55, 56, slide within the bundle grippers 55, 56 or move relative to the respective bundle gripper 55, 56.

The bundle grippers 55, 56 each enclose the cable 12 or cables 12 in the closed position. The bundle grippers 55, 56 form the plurality of cables 12 into a compact bundle, so that it can be grasped and held in a technically simple manner by a gripper arm 70 (FIG. 5) and can be transported out of the removal trough 30 by the gripper arm 70.

The bundle or batch of cables 12 or a part thereof can be clamped between the bundle grippers 55, 56, so that it can be grasped technically simply by a gripper arm 70 in that the gripper arm 70 reaches between the bundle grippers 55, 56 and in this way grips the cable 12. After the gripper arm 70 has gripped the cables 12, the two bundle grippers 55, 56 open so that the gripper arm 70 can move the held cables 12 or the batch of cables 12 can move upward away from the removal trough 30 or the bundle grippers 55, 56.

Figure 5:
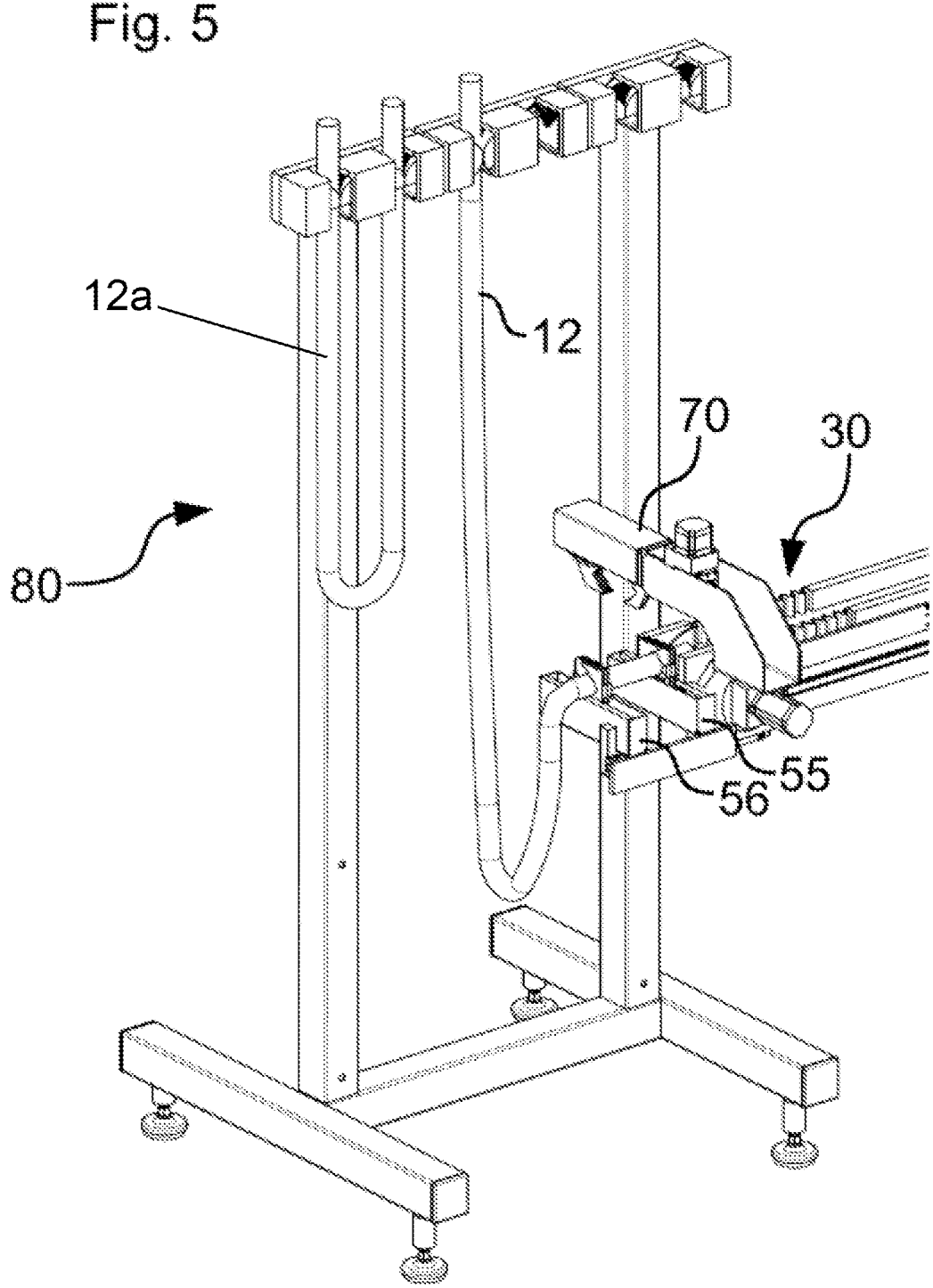
FIG. 5 is a detailed view of the removal trough from FIG. 3 or FIG. 4 with a gripper arm.
Figure 6:
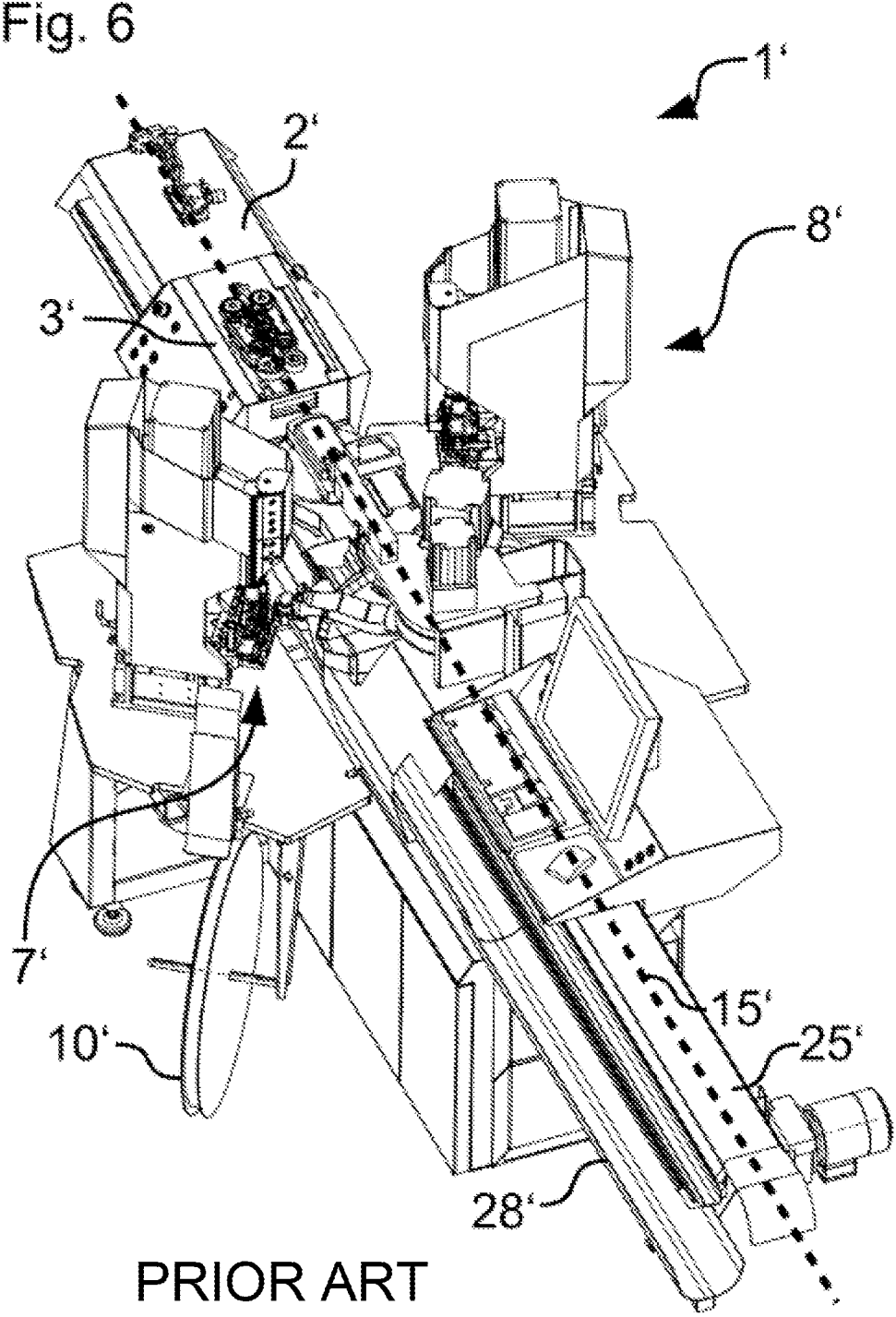
FIG. 6 shows a cable processing system according to the prior art.

FIG. 5 shows a detailed view of the removal trough 30 from FIG. 3 or FIG. 4 with a gripper arm 70.

In FIG. 5, the respective production batches of cables 12 or bundles of cables 12 are shown as cylinders to simplify the drawing.

On the left in FIG. 5, a cable bundle or a batch of cables 12a, each with a part near its ends, is fastened or clamped in a holder of a cable rack 80.

FIG. 5 shows a situation after the front end of a further cable bundle or a further batch of cables 12 has already been moved to an end of the removal trough 30, has been gripped by a gripper arm 70 and has been fastened in a receptacle or holder of a cable rack 80.

The gripper arm 70 can be moved in space by means of a device (not shown).

The rear end of the cable bundle or the batch of cables 12 is held in the closed position by the two bundle grippers 55, 56 or the jaws of the two bundle grippers 55, 56, the bundle grippers 55, 56 being as far away from each other as possible. Previously, the outer bundle gripper 56, i.e. the one further away from the exit conveyor belt 35, has gripped part of the cable bundle, while the inner bundle gripper 55 was in a partially closed position and the cables 12 slipped through the inner bundle gripper 55. As a result of the friction between the cables 12 and the inner bundle gripper 55, the part of the cable 12 between the bundle grippers 55, 56 has been stretched and does not sag slack, but rather runs essentially horizontally. This enables the gripper arm 70 to grip and hold this part in a technically simple manner.

After gripping the rear part of the cable 12, the two bundle grippers 55, 56 open so that the cable 12 is now fastened or clamped in a holder or fixture of the cable rack 80 by the gripper arm 70.

The automated discharge of the production batches of cables 12 or of the cables 12 makes it possible for the cable processing machine 5 to automatically feed systems arranged downstream for the storage and/or transport of the production batches or the cables 12. These systems can be designed very differently depending on the desired logistics process. For example, the production batches or the cables 12, after they have been moved out of the removal trough 30, can be placed in stationary intermediate storage units which can accommodate a limited number of batches and/or transportable storage units such as cable racks with rollers (see FIG. 5), transport boxes or the like, which serve to bring the cables 12 or production batches to a subsequent processing station.

Because the removal trough 30 moves the cables 12 or batches of cables 12 away from the cable processing machine 5, the cables 12 or batches of cables 12 can be removed from the removal trough 30 in a technically particularly simple manner, for example by means of a gripper arm 70. The cable processing machine 5 then does not impede namely the gripper arm 70 in its movements.

In particular, because after the transport of the cable 12 or cables 12 a part of the cable 12 or cables 12 protrudes beyond the end 33 of the removal trough 30, the cable 12 or cables 12 can be grasped by a technically simple gripper arm.

The distance that the production batch of cables 12 or cables 12 must be moved by means of the exit conveyor belt 35, for example to get to the end of the exit conveyor belt 35, can be calculated, for example, by a machine control, since the length of the cables 12 and the desired position of the production batch of cables 12 or of the cables 12 after the discharge or conveying are known.

Finally, it should be noted that terms such as "having," "comprising," etc. do not preclude other elements or steps, and terms such as "a" or "an" do not preclude a plurality of elements or steps. Furthermore, it should be noted that features or steps that have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS 1, 1' Cable processing machine system
2, 2' Straightening unit
3, 3' Cable conveyor
5 Cable processing machine
7, 8, 7', 8' Crimping press
10, 10' Contact roller
12, 12a Cable
13 Transport direction of the cables
15, 15' Cable processing axis
20 Cable tray
25, 25' Conveyor belt
28' Prior art removal trough
30 Removal trough
33 End of the removal trough
35 Exit conveyor belt
40, 41 Sidewall of the removal trough
50 Deflection roller
52 Feed motor
53 Paneling
55, 56 Bundle gripper
58 Rail of the bundle gripper
60 Support surface
65, 66 Sidewall of the support surface
70 Gripper arm
80 Cable rack

The invention claimed is:

1. A cable processing machine system comprising:
a cable processing machine for processing cables;
a cable tray for receiving the cables processed by the cable processing machine;
a removal trough, the cable tray being pivotable to transfer the cables in the cable tray from the cable tray into the removal trough when the cable tray pivots; and
wherein the removal trough includes a movable exit conveyor belt for conveying the cables longitudinally along a transport direction away from the cable processing machine to an end of the removal trough, where the transport direction is aligned with a longitudinal direction of the cables.

2. The cable processing machine system according to claim 1 wherein the removal trough has sidewalls extending parallel to the transport direction.

3. The cable processing machine system according to claim 2 wherein the sidewalls are connected to the exit conveyor belt to move together with the exit conveyor belt.

4. The cable processing machine system according to claim 2 wherein the sidewalls each are formed with an accordion shape in a cross section parallel to a surface of the exit conveyor belt, wherein the sidewalls can at least partially extend and compress along a direction that runs parallel to the transport direction, and the removal trough includes a deflection roller deflecting the exit conveyor belt and the sidewalls.

5. The cable processing machine system according to claim 1 wherein the removal trough includes at least one bundle gripper at one end of the removal trough for gripping and holding at least one of the cables.

6. The cable processing machine system according to claim 1 wherein the removal trough includes two bundle grippers at one end of the removal trough for gripping and holding at least one of the cables.

7. The cable processing machine system according to claim 6 wherein the bundle grippers are adapted to apply an adjustable gripping force for gripping the at least one of the cables.

8. The cable processing machine system according to claim 6 wherein at least one of the bundle grippers is movable to increase and decrease a distance between the bundle grippers in the transport direction for tensioning a part of the at least one of the cables extending between the bundle grippers.

9. The cable processing machine system according to claim 1 wherein the removal trough at the end of the exit conveyor belt has a support surface that is immovable relative to the cable tray for supporting a part of the cables.

10. The cable processing machine system according to claim 9 wherein the removal trough includes support surface sidewalls laterally delimiting the support surface.

11. The cable processing machine system according to claim 1 wherein the exit conveyor belt moves parallel to a direction that runs in a longitudinal direction of the cable tray, the cable tray having a greatest extent along the longitudinal direction.

12. The cable processing machine system according to claim 1 wherein the removal trough extends further away from the cable processing machine than the cable tray extends away from the cable processing machine.

13. The cable processing machine system according to claim 1 wherein the transport direction extends parallel to a cable processing axis along which the cables are moved during the processing of the cables by the cable processing machine.

14. A method for removing cables from the removal trough of the cable processing machine system according to claim 1, the method comprising the steps of:
moving a cable located in the removal trough, using the exit conveyor belt, away from the cable processing machine to the end of the removal trough; and
using a gripper arm gripping the cable located at the end of the removal trough and removing the cable from the removal trough.

15. The method according to claim 14 including holding the cable with at least one bundle gripper at the end of the removal trough while the gripper arm grips the cable.

16. The method according to claim 15 including holding the cable under tension by two of the bundle grippers while the gripper arm grips the cable.

17. A cable processing machine system comprising:
a cable processing machine for processing cables;
a cable tray for receiving the cables processed by the cable processing machine;
a removal trough, the cable tray being pivotable to transfer the cables in the cable tray from the cable tray into the removal trough when the cable tray pivots; and
wherein the removal trough includes a movable exit conveyor belt for conveying the cables along a transport direction away from the cable processing machine to an end of the removal trough, and the removal trough further includes sidewalls extending parallel to the transport direction.

18. The cable processing machine system according to claim 17 wherein the removal trough includes two bundle grippers at one end of the removal trough for gripping and holding at least one of the cables.

19. The cable processing machine system according to claim 17 wherein the removal trough at the end of the exit conveyor belt has a support surface that is immovable relative to the cable tray for supporting a part of the cables.

20. The cable processing machine system according to claim 17 wherein the exit conveyor belt moves parallel to a direction that runs in a longitudinal direction of the cable tray, the cable tray having a greatest extent along the longitudinal direction.

\* \* \* \* \*